(12) United States Patent
Baldi et al.

(10) Patent No.: US 7,316,741 B2
(45) Date of Patent: Jan. 8, 2008

(54) CERAMIC COLORANTS IN THE FORM OF NANOMETRIC SUSPENSIONS

(75) Inventors: Giovanni Baldi, Montespertoli (IT); Marco Bitossi, Montelupo Fiorentino (IT); Andrea Barzanti, Empoli (IT)

(73) Assignee: Colorobbia Italia S.p.A. (IT)

( * ) Notice: Subject to any disclaimer, the term of this patent is extended or adjusted under 35 U.S.C. 154(b) by 0 days.

(21) Appl. No.: 10/507,041

(22) PCT Filed: Mar. 6, 2003

(86) PCT No.: PCT/EP03/02281

§ 371 (c)(1), (2), (4) Date: Oct. 12, 2004

(87) PCT Pub. No.: WO03/076521

PCT Pub. Date: Sep. 18, 2003

(65) Prior Publication Data

US 2005/0103230 A1    May 19, 2005

(30) Foreign Application Priority Data

Mar. 8, 2002    (IT) .......................... FI2002A0038

(51) Int. Cl.
*C09C 3/08* (2006.01)
*C09C 3/00* (2006.01)
*C09C 1/00* (2006.01)
*C04B 14/00* (2006.01)

(52) U.S. Cl. ............... 106/499; 106/403; 106/419; 106/431; 106/436; 106/441; 106/450; 106/451; 106/453; 106/454; 106/440; 106/459; 106/460; 106/479; 106/480; 106/471; 106/491; 106/481

(58) Field of Classification Search ........ 106/420, 106/431, 499, 459, 441, 482, 451, 440, 453, 106/430, 403, 419, 436, 450, 454, 460, 471, 106/479, 481; 423/598, 595, 594, 263, 326
See application file for complete search history.

(56) References Cited

U.S. PATENT DOCUMENTS

| 4,289,745 | A | * | 9/1981 | Patil .................... 423/594.1 |
| 4,292,294 | A | * | 9/1981 | Patil et al. ............... 423/594.1 |
| 4,448,608 | A | * | 5/1984 | Jenkins et al. ............. 106/428 |
| 5,665,157 | A |   | 9/1997 | Oehlert et al. |
| 5,746,817 | A | * | 5/1998 | Katsen et al. ............ 106/31.65 |
| 5,797,988 | A |   | 8/1998 | Linde et al. |
| 5,846,315 | A |   | 12/1998 | Johansen, Jr. |
| 6,024,786 | A | * | 2/2000 | Gore ..................... 106/31.65 |
| 6,228,160 | B1 | * | 5/2001 | Hanich et al. ............. 106/456 |
| 6,245,849 | B1 | * | 6/2001 | Morales et al. ............ 524/442 |
| 6,537,364 | B2 | * | 3/2003 | Dietz et al. ............... 106/493 |
| 6,582,508 | B2 | * | 6/2003 | Dietz et al. ............... 106/493 |
| 6,620,214 | B2 | * | 9/2003 | McArdle et al. ............. 51/298 |
| 6,634,576 | B2 | * | 10/2003 | Verhoff et al. ............... 241/21 |
| 6,723,138 | B2 | * | 4/2004 | Nickel et al. ............... 8/637.1 |
| 6,837,918 | B2 | * | 1/2005 | Pozarnsky et al. ........... 95/149 |
| 6,881,448 | B1 | * | 4/2005 | Hattori .................... 427/307 |
| 6,881,483 | B2 | * | 4/2005 | McArdle et al. ........... 428/403 |

FOREIGN PATENT DOCUMENTS

| EP | 0 742 186 AQ | 10/1996 |
| WO | WO 00/37386 | 6/2000 |

OTHER PUBLICATIONS

Claus Feldmann; "Preparation of Nanoscale Pigment Particles"; Advanced Material; Sep. 3, 2001; pp. 1301-1303.

Claus Feldmann and Hans-Otto Jungk; "Polyol-Mediated Preparation of Nanoscale Oxide Particles"; Angew. Chem. Intl; 2001; pp. 359-362.

Jacqueline Merikhi, Hans-Otto Jungk and Claus Feldmann; "Submicrometer CoAL2o4 Pigment Particles—Synthesis and Preparation of Coatings"; The Royal Society of Chemistry, 2000; pp. 1311-1314.

* cited by examiner

*Primary Examiner*—Karl E Group
(74) *Attorney, Agent, or Firm*—Stetina Brunda Garred & Brucker

(57) ABSTRACT

Described herein are ceramic colorants consisting of suspensions of particles of nanometric dimensions, their production and use.

2 Claims, No Drawings

CERAMIC COLORANTS IN THE FORM OF NANOMETRIC SUSPENSIONS

FIELD OF THE INVENTION

The present invention relates to colorants for the colouring of ceramic materials that can be used in the usual firing processes used for the production of these materials.

STATE OF THE ART

Ceramic materials are inorganic non-metallic materials, consisting of metallic and non-metallic elements bonded together prevalently by ionic and/or covalent bonding. Chemically speaking they are represented by oxides (simple or complex as titanate, silicate etc.) and by non-oxides (as sulphides or selenides). Their micro-structure is formed by crystalline and amorphous bound together with specific morphology and characteristics.

The colouring of ceramic materials represents one of the most important sectors of research for the development of new products useful for this purpose.

Colorants for ceramic materials are required, in fact, to meet particular criteria of brilliancy and conservation of tonality and moreover must have a structure and composition capable of guaranteeing their stability at the high temperatures to which they are subjected during the steps of production of the end products.

By the term "ceramic colorants", according to the invention, are meant ceramic colours and ceramic pigments.

The ceramic colours are chromophores metal oxides capable of bestowing a colouring upon materials consisting of glass or vitreous components and crystalline components. They dissolve in the glass that is formed by fusion of the raw materials constituting the ceramic material, conferring thereon the typical colourings of the transition ion in the vitreous structure.

These colours depend both upon the electronic structure of the ion, and hence also upon its state of oxidation, and upon the chemical composition of the vitreous part.

Ceramic colours find application in glass and in ceramic technology, in the field of enamels and dry granulated frit.

Amongst the chromophore metallic oxides which are used in ceramic colours, the following may be recalled as examples: $Fe^{2+}$ (green), $Fe^{3+}$ (brown), $Mn^{3+}$ (purple), $Cu^+$ (red), $Cu^{2+}$ (blue in sodium-silicate glasses and green in lead glasses), $Co^{2+}$ (dark blue), $Cr^{3+}$ (green).

A particular class of ceramic colorants is then constituted by metallic colorants, particles of metals reduced to the elementary state, such as, for example, $Au^0$, $Ag^0$ and $Cu^0$, which impart upon the vitreous mass a colouring that varies between yellow and red. Ceramic pigments are crystalline powders normally produced by calcining, at high temperatures, a mixture of raw materials consisting generally of oxides, mixed oxides, carbonates, silicates of metals of the transition series, or elements of the rare earths, sulphides or selenides in the presence of appropriate mineralizing agents, in general fluorides and carbonates of alkaline and alkaline-earth metals, and in conditions of firing that may be either oxidizing or reducing.

The product obtained from calcining is subjected to a further grinding to produce a powder having appropriate dimensions and then to washing for removal of the soluble salts that have remained (for example, fluorides and vanadates).

Grinding, which is normally carried out in mills of the Asling type with balls of sintered alumina, makes it possible to obtain powders having dimensions not smaller than 2 μm. Using more sophisticated techniques, it is possible to arrive at $d_{50}$ finenesses of 1-1.5 μm, for example by means of microsphere vibration mills or with pressure particle-micronizers of the Osokawa type.

Washing is necessary to eliminate the soluble and/or toxic compounds that would have an adverse effect on the subsequent application of the pigments in ordinary ceramic technologies.

After washing, there is required a further operation of drying and a standardization of the pigment with corrections of colour by means of standard pigments or inert materials (as $SiO_2$).

The pigments are incorporated, in the form of powder, in the ceramic bodies and in the glazes and impart upon the product its typical colouring due to the absorption of specific wavelengths of polychromatic light.

Amongst the pigments generally used for colouring ceramic materials, it is possible to cite cobalt aluminate $CoAl_2O_4$ (dark blue), $(Zr_{1-x},Pr_x)SiO_4$ (wherein $0.01<x<0.1$) (yellow), $(Cr_x,Sb_x,Ti_{1-x})O_2$ (wherein $0.04<x<0.08$) (yellow), $CaSn_{1-x}Cr_xSiO_5$ (purple) (wherein x is comprised between 0.01 and 0.15), $Sn_{1-x}Cr_xO_{3-x/2}$ (wherein x is comprised between 0.01 and 0.15).

In the known art, the colouring of ceramic products is therefore normally obtained by dry or wet grinding of the materials responsible for colouring with the other components of the ceramic material and then subjecting the mixture (possibly appropriately shaped) to the customary firing cycles.

Alternatively, the ceramic colorants are melted together with the melting batch so as to obtain coloured grits or frits, which are in turn incorporated in the ceramic materials according to the techniques in use in ceramic technology.

As regards the glazes, this is applied dry or wet on a ceramic substrate and then subjected to the usual firing cycles.

An alternative known way to obtain colouring of ceramic materials consists in applying to the appropriately prepared substrate liquid colorants consisting of solutions of inorganic salts, generally of transition metals, or organometallic compounds with chromophore action in water, and possibly other solvents or their mixtures.

These solutions may also be premixed with ceramic powders, which are then applied on the substrate (for example, stoneware ceramic substrate or the base enamel of is ceramic tiles).

The substrate is then subjected to appropriate heat treatment, as described previously. Normally, liquid colorants are aqueous solutions (containing wetting substances, suspending agents, and lubricating agents) of salts of transition metals, such as for example salts of: $Co^{++}$, $Ni^{++}$, $Cr^{+++}$, $Cu^{++}$, etc.

Traditional ceramic colorants, such as those described above, present, however, certain drawbacks.

On account of the method of preparation described above, it is not possible to guarantee a constancy in colour, and consequently corrections are necessary using different colorants and colorants of greater intensity. This fact, in addition to the cost of the operation, may lead to problems in the application of the colorants, above all when the blending products prove poorly compatible with the ceramic materials that are to be coloured.

The presence of soluble salts imposes the need for an operation of washing and drying of the pigment, which involves an industrial cost and does not preserve from the risk of having, in the final pigment, residue that could jeopardize the ceramic application. Another problem is represented by the dimensions of the particles. For example, as mentioned above, after calcining, the pigments must be ground because the colouring capacity and the quality of ceramic materials depends upon the size of the particles, and hence the granulometric distribution depends upon the effectiveness of the grinding process.

A third point is the relatively low purity of the materials, which may give rise to problems in the quality of the applied product, deriving from the raw materials used and from the process.

The problems that arise with colorants in liquid form lie in the difficulty of obtaining a wide range of shades of colour. In fact, during the firing process, the metallic salts and the organometallic compounds are decomposed on the ceramic substrate, and the final chromatic result is the one corresponding to the specific oxide of the transition metal. Moreover the reactivity of these metal salts with the substrate must be also considered, in fact their reactivity can produce compounds having different colours from the wanted ones during the firing step.

Furthermore, the presence of salts of transition metals in solution renders these products very toxic for the end user.

In the literature (see, for example Claus Feldman, "Preparation of Nanoscale Pigment Particles" Adv. Mater. 2001, 13, No. 17, September 3, pp. 1301-1303; Claus Feldman et al. "Polyol-Mediated Preparation of Nanoscale Oxide Particles" Angew. Chem. Int. Ed., 2001, 40, No. 2, pp. 359 to 362 and Jacqueline Merikhi et al. "Sub-micrometer $CoAl_2O_4$ pigment particles • synthesis and preparation of coatings" J. Mater. Chem. 2000, 10, pp. 1311-1314), there are described inorganic substances containing metal oxides in the form of particles of nanometric size. In particular, suspensions of particles of $CoAl_2O_4$, $TiO_2$, $ZnCo_2O_4$, $Ta_2O_5$, $Fe_2O_3$, $Nb_2O_5$, $CoO$, $ZnO$, $Cu_2O$, $Cr_2O_3$, $Ti_{0.85}Ni_{0.05}Nb_{0.10}O_2$, $Cu(Cr,Fe)O_4$ are described, in addition to metals of the type: $Sn^0$, $Fe^0$, $Ru^0$, $Au^0$, $Co^0$, $Ni^0$, and Ni—Co, $Ag^0$, $Pd^0$, $Rh^0$, $Pt^0$ alloys having nanometric dimensions. However, no indication regarding their use as ceramic colorants for the decoration of stoneware or of ceramic enamels nor their use in the textile, catalysts and pharmaceutical or cosmetic fields, appears in these documents.

In this connection, it should be noted that the above-mentioned products cannot be considered as ceramic colorants, with the exclusion of $CoAl_2O_4$, of which, however, as has been said, there is indicated only the possible use as material for coating planar surfaces (Merikhi, Feldmann 2000).

Finally, as regards metallic pigments, the use of colloidal gold in colouring glass has been known for some time. However, there has never been found a use thereof as ceramic colorant at high temperatures as in the case in point.

In the light of what has been said above, there is thus an evident interest in developing ceramic colorants that enable the problems illustrated above to be overcome.

DETAILED DESCRIPTION OF THE INVENTION

It has now been surprisingly found that ceramic colorants, as defined above, constituted by particles of nanometric dimensions (i.e., having in general a mean diameter of between 5 nm and 600 nm) enable the problems described to be overcome.

Their dimensions and their high dispersion in the liquid medium enable an innovative use thereof in ceramic applications.

The dimensions, which range from less than ten to a few hundred nanometres enable, on a ceramic substrate with even very low porosity, penetration of the pigment for a considerable depth of material (up to a few millimetres) or else the distribution thereof on a planar surface of glass or raw glaze.

Furthermore, nanometric particles have the stoichiometry of the desired ceramic pigments; consequently, there will not be ionic species of transition metals present in suspension, with all the environmental problems that this entails.

The colorants according to the present invention hence consist of suspensions of nanometric particles, in which the solvent consists of diethylene glycol (DEG, $HOCH_2CH_2OCH_2CH_2OH$) or ethylene glycol ($HOCH_2CH_2OH$), or in any case an alcohol or solvent with high boiling point.

More particularly, the pigments according to the present invention are represented by suspensions of particles having nanometric dimensions of compounds of chromogenic metals chosen in the group consisting of:

Au, Al, Cu, Cr, Co, Dy, Fe, Gd, Y, La, Mo, Mn, Ni, Pr, Si, Ti, Zr, W, Ag, Zn, Er, Yb.

where by "compounds", according to the invention, are meant oxides, mixed oxides, or silicates of said compounds.

Particular ceramic colorants according to the invention are suspensions as defined below:

$M^{II}M^{III}_2O_4$, where $M^{II}$ is chosen in the group consisting of $Fe^{II}$, $Zn^{II}$, $Co^{II}$, $Ni^{II}Mn^{II}$, and $M^{III}$ is chosen in the group consisting of $Fe^{III}$, $Al^{III}$, $Cr^{III}$, $Mn^{III}$;

| | |
|---|---|
| $CoAl_2O_4$ | dark blue |
| $Ti(Sb,Cr)O_2$ | yellow |
| $(Zr,Pr)SiO_4$ | yellow |
| $(Zr,V)SiO_4$ | turquoise |
| $(Al,Cr)_2O_3$ | red |
| $(Al,Cr) MO_3$ | red, where M = Y, Nd, Sm, Eu, Gd, Tb, Dy, Ho, Er, Tm, Yb |
| $CaSn_{1-x}Cr_xSiO_5$ | purple (where x is comprised between 0.01 and 0.1) |
| $Ti(Sb,Ni)O_2$ | yellow |
| $(Zr,V)O_2$ | orange |
| $(Zr,Pr)O_2$ | yellow |
| $(Sn,V)O_2$ | yellow |
| $Sn_{1-x}Cr_xO_{3-x/2}$ | purple |
| $Au^0$ | red |
| $Ag^0$ | yellow |
| $Cu^0$ | red |

The preparation of the colorants according to the invention takes place according to known procedures that employ the polyol process, which is widely described in the literature.

In brief, the process consists in the use of an alcohol with high boiling point, which makes it possible to work at high temperatures and to complex the particles being formed, so preventing their growth.

Normally, the procedure is to add to a known volume of alcohol (for example, DEG) the salts (preferably acetates, carbonates, sulphates, oxalates, chlorides) of the desired metals. The solution is then heated and simultaneously kept under stirring up to complete solubilization of the salts. Water is added in appropriate amounts to facilitate hydrolysis of the salts (which leads to the formation of the corresponding oxides), and the solution is heated up to a temperature that depends upon the final pigment that it is to be prepared and, in any case, higher than 120° C.

The alcohol not only facilitates the formation of the oxides but, thanks to its complexing capacity, prevents the growth of the particles.

After remaining for a period at a high temperature, which varies from system to system, there is obtained a suspension which, once left to cool at room temperature, is used just as it is, or else centrifuged and dried.

Preferably, should the aim be to produce suspensions of nanometric particles of metals (as, for example, in the case of $Au^0$, $Ag^0$ or $Cu^0$), there are added to the high-boiling alcohol the appropriate protector colloids, such as, for instance, polyvinyl pyrrolidone, which is a polymer formed by monomers of formula ($C_6H_9NO$), (ACRILEM CL) or polyurethane-based resins (IDROCAP 200).

According to a particular embodiment of the process, there are rapidly added the reagents (solutions of metal salts) to the solvent (for example, water and DEG), which has previously been brought to the desired temperature of hydrolysis, and then, after a period of time, which also depends upon the system being synthesised, the suspension is brought to room temperature, and the procedure as described above is followed.

According to this particular embodiment, polar solvents are used for facilitating solubilization of the precursor salts, and then the reaction environment is dehydrated with dehydrating agents of the type $CaCl_2$ or $Na_2SO_4$ or water is removed by distillation. A further particular embodiment of the process consists in using an unmixable solvent in the high-boiling alcohol (or another solvent) and then creating an emulsion of micelles of nanometric dimensions with water, the final dimensions of the particles will be controlled by the dimensions of the micelles formed previously.

It is interesting to note that the suspensions obtained have different (frequently completely different) colouring from the one (absolutely unpredictable a priori) that they are to impart on the finished product, once the firing processes to which the ceramic material is subjected are completed, as may be better understood from the examples given in what follows.

The present invention moreover relates to a particular process of control of the purity and degree of formation of the nanometric particles.

According to the said process, the suspension is subjected to a cycle of membrane dialysis. In this way, according to the washing solution adopted, the final suspension is enriched in the desired solvent (water, alcohol), and it is possible to eliminate the anions of the metallic salts used and thus to control the yield of the reaction by means of chemical analysis on the washing solution. In fact, the presence of the metallic ion in the washing solution means that the reaction of hydrolysis and the subsequent formation of the particles is not complete and that ions of the metal that has failed to react have passed through the membrane into the washing solution. At an industrial scale, this operation may be conducted via a process of ultrafiltration.

If so preferred, the ceramic colorants according to the invention, besides being in the form of a suspension, may be obtained in the form of powder by centrifuging the suspensions and drying the precipitate or by techniques as spray dry. In this case, they may be resuspended in an appropriate solvent prior to application, or else applied as such, according to known techniques of ceramic decoration, in ceramic bodies or in enamels or grits.

Provided in what follows are a few examples of preparation of the colorants according to the invention. For each example two different processes of preparation are described.

EXAMPLE 1

Phase I

Reagents:
71.60 cc of $Ti[OCH(CH_3)_2]_4$.
71.42 cc of DEG (diethylen glycol)

Synthesis 71.42 $cm^3$ of DEG are pored in a four necked reactor equipped with stirrer, Liebig's refrigerant, thermometer and dripping funnel. The solvent is heated up to 140° C. and 71.60 $cm^3$ of titane isopropoxide are added drop by drop. Since white vapours of $TiO_2$, due to the violent decomposition of the alkoxide, develops because of the presence of humidity, it is better to work in nitrogen current.

When the alkoxide contacts the DEG it decomposes and forms isopropyl alcohol. The mixture is cooled down and a viscous, yellow product is collected (such product is still reactive but less than the starting alkoxide).

Phase II

Reagents:
19.24 cc of the phase I product
1.80 g of $Cr(CH_3COO)_3 \times 4H_2O$
1.32 g. of $SbCl_3$
150 cc of DEG (diethylen glycol
20 cc $H_2O$ deionised
30 cc acetic acid 80%

Synthesis:

100 cc of DEG, 20 cc of $H_2O$, 30 cc of acetic acid 80% and the indicated quantities of $SbCl_3$ e $Cr(CH_3COO)_3$ (see Reagents) are poured in a three necked reactor equipped with thermometer, reflux refrigerator and stirrer; the mixture is heated at about 60° C.; thereafter 19.24 cc of the product deriving from phase I are introduced using a peristaltic pump. The last product must be introduced very slowly in order to permit the solution of the product as soon as it comes into contact with the DEG; moreover the pipe of the peristaltic pump must be immersed in the solution, acting as described no lumps of gel will form.

Once the addition is completed the solution is heated at reflux temperature (about 120° C.) and the mixture is left under reflux for about 30'; a yellow-green solution is obtained, the solution is stable in water which can therefore be used as solvent to dilute the solution.

The pigment $(Ti(Sb,Cr)O_2)$ can be concentrated by distillation under vacuum (p<5 is mbar at about 115° C.); concentrations higher than 10% in $TiO_2$ can be obtained.

EXAMPLE 2

Reagents:
3.22 g. of $ZrOCl_2 \times 8H_2O$
2.08 g. of TEOS
0.17 g. of $NH_4VO_3$
100 cc of DEG (diethylen glycol)

Synthesis:

100 $cm^3$ of DEG and the indicated quantity of reagents (se above) are poured in a three necked reactor equipped with stirrer, reflux refrigerator, thermometer.

The mixture is stirred and heated up to complete dissolution of the reagents.

The mixture is thereafter heated up to 180° C. and the solution becomes opalescent. The solution is left under vigorous stirring for 1 h at 180° C. and then cooled down; a transparent solution of $ZrSiO_4$: V is obtained.

EXAMPLE 3

Reagents:
1.0 g. of $AuCl_3$
10 g. of PVP (Poly Vinyl Pirrolidone)
200 cc DEG (diethylen glycol)

Synthesis:
200 $cm^3$ of DEG and the indicated quantity of reagents (se above) are poured in a three necked reactor equipped with stirrer, reflux refrigerator, thermometer.

The mixture is stirred and heated up to complete dissolution of the reagents.

The mixture is thereafter heated up to 160° C. and, once the temperature is reached, the solution stirs from yellow to red and then brown. The heating is stopped immediately after the change in colour and the solution ($Au^0$) is cooled down.

The solution can be concentrated with a post-synthesis treatment by evaporating the solvent in a rotavapor or by distillation.

EXAMPLE 4

Reagents:
2.49 g. of $Co(CH_3COO)_2 \times 4H_2O$
7.43 g. of $Cr(CH_3COO)_3 \times 4H_2O$
50 cc of DEG (diethylen glycol)

Synthesis:
50 $cm^3$ of DEG and the above indicated reagents quantities are poured in a three necked reactor equipped with stirrer, thermometer and reflux refrigerator.

The mixture is stirred and heated until the reagents are completely solved.

When the temperature of 140° C. is reached 2 ml $H_2O$ are added and the reaction is kept for 30' at the same temperature. Thereafter it is heated up to 180° C. and the solution is kept at the same temperature for about 2 h.

The mixture is cooled down under stirring obtaining a green solution of $CoCr_2O_4$.

EXAMPLE 5

Reagents:
6.29 g of $Co(CH_3COO)_2 \times 4H_2O$
11.99 g. of $Fe(CH_3COO)_2$ OH
0.43 g of $Zn(CH_3COO)_2 \times 2H_2O$
0.10 g of $Mn(CH_3COO)_2 \times 2H_2O$
4.23 g of $Ni(CH_3COO)_2 \times 4H_2O$
20.32 g of $Cr(CH_3COO)_3 \times 4H_2O$
100 cc of DEG (diethylen glycol)

Synthesis:
100 $cm^3$ of DEG and the above indicated reagents quantities are poured in a three necked reactor equipped with stirrer, thermometer and reflux refrigerator.

The mixture is stirred and heated until the reagents are completely solved.

The temperature is raised up to 180° C. and maintained for 2 h. Finally the mixture is cooled down under stirring giving a solution of black $(Mn, Zn, Ni, Co)(Fe, Cr)_2O_4$.

Alternative Synthesis of Fe Precursor:

Phase 1
In a three necked reactor containing deionised water are poured continuously a 10% solution of $Na_2CO_3$ and a 10% solution of $Fe_2(SO4)_2$.

The suspension of iron idroxide is filtered on a buckner funnel and washed.

The precipitate is dryed in owen at 110° C. for 2 hours.

Phase 2
The phase 1 product is added to a stoichiometric amount of $CH_3COOH$ with an excess of 15-20% in weight.

The suspension is stirred and heated until the complete solubilization of solid; an amount of DEG (diethylen glycol) is added and the excess of acetic acid and water are distilled.

EXAMPLE 6

Reagents:
3.22 g. of $ZrOCl_2 \times 8H_2O$
2.08 g. of TEOS
0.46 g. of $Pr(CH_3COO)_3$
100 cc of DEG (diethylen glycol)

Synthesis:
100 $cm^3$ of DEG and the above indicated reagents quantities are poured in a three necked reactor equipped with stirrer, thermometer and reflux refrigerator.

The mixture is stirred and heated until the reagents are completely solved.

After solubilization the temperature is raised up to 180° C., the solution become opalescent and is left under vigorous stirring for 1 h at 180° C. and thereafter cooled down, giving a transparent light yellow solution of $(Zr,Pr)SiO_4$.

EXAMPLE 7

Reagents:
2.00 g of $Cr(CH_3COO)_3 \times 4 H_2O$
1.85 g. of $FeSO_4 \times 7 H_{20}$
100 cc of DEG (diethylen glycol)

Synthesis:
100 $cm^3$ of DEG and the above indicated reagents quantities are poured in a three necked reactor equipped with stirrer, thermometer and reflux refrigerator.

The mixture is stirred and heated until the reagents are completely solved.

When the temperature of 120° C. is reached 2 ml $H_2O$ are added and the reaction is kept for 1 h at the same temperature. Thereafter it is heated up to 180° C. and the solution is kept at the same temperature for about 1 h.

The mixture is cooled down under stirring obtaining a brown solution of $FeCr_2O_3$.

EXAMPLE 8

Reagents:
50 cc of Al(sec-butoxide)$_3$
4.88 g. of $Mn(CH_3COO)_3 \times 2H_2O$
100 cc DEG (diethylene glycol)

Synthesis:
The reagents are placed in a reactor equipped with reflux refrigerator, Liebig's refrigerator, stirrer and thermometer.

The mixture is heated up to alkoxide decomposition (160° C.) and the butanole is distilled. The Liebig's refrigerator is disconnected and the temperature is raised up to 180° C. refluxing for 1 h. The solution is cooled down, the solution gelifies if in contact with air humidity, applied on gres shows a pink colour due to the presence of the pink pigment $(Al_{0.84}, Mn_{0.16})_2O_3$.

Applications

The pigments according to the invention, in addition to yielding excellent results in colouring of ceramic products have moreover surprisingly proven particularly suitable for colouring yarns and fabrics.

In addition to colouring, the colorants described, when used on fabrics, have demonstrated surprisingly unusual characteristics as regards, for example, UV protection, thermal insulation, and re-emission of electromagnetic radiation in the IR spectrum, antistaticity and mechanic resistance.

Some of the described suspensions, for example gold suspensions, and the coloured pigments shows also unexpected aesthetic qualities on fabrics.

The suspensions of Example 1 are applied on an unfired porcelain-stoneware substrate (gres). After baking in the customary stoneware cycle there is noted the appearance of a yellow-orange colouring. The colouring is caused by the pigment $Ti(Sb,Cr)O_2$.

The suspensions of Example 2 are applied on an unfired porcelain-stoneware substrate. After firing in the customary stoneware cycle, there is noted the appearance of a light-blue colouring due to the pigment of formula $(Zr,V)SiO_4$.

The particles of $Au^0$ of nanometric dimensions, as obtained according to Example 3, applied on a ceramic substrate, such as for example unfired porcelain stoneware, once the substrate has been baked at a temperature that is usual for the ceramic cycles for stoneware (1200° C. and higher) enable a red colouring to be obtained, which is absolutely unexpected at that temperature.

If the suspensions are applied to a textile according to the traditional techniques they confer to the textile also a high degree of antistaticity.

The suspensions of Example 4 applied to a gres substrate, after firing in the usual stoneware cycle give a green-blue colour due to the pigment $CoCr_2O_4$, while the suspensions of examples 5, 6, 7, 8 give respectively black, yellow, brown and pink/red colours.

The suspensions of Examples 1-8 may also be applied on vitreous surfaces such as glasses or glazes, or ceramic substrates that have already undergone thermal treatment. In this case, after firing at temperatures of between 500° C. and 800° C., there is again noted formation of the colour.

The suspension can be applied on crude glazes, i.e before firing, using known techniques (serigraphy, rotocolour, sprying etc.) as such or in combination with organic carriers (for example thickening or fluidificants agents); in this connection it is important to note that thanks to the described pigments characteristics the colour can penetrate in the vitreous substrate, therefore the obtained product can, for example, be polished without affecting the colour.

The suspensions of Examples 1-8 can of course be applied on substrates of non-ceramic materials (plastics, metals) when it is necessary to subject said materials to heat treatments at a low temperature, which enable the formation of coloured layers or layers with particular chemico-physical qualities.

All the suspensions can be used in textile applications, both for example by means of the technique of impregnation of the fibre and by that of spreading with adequate thickening means, according to the specific chemical-physical characteristics of the colouring material.

Moreover the present materials can be used as catalysts for chemical reactions and in the pharmaceutical industry as activators in particles loaded with biological active principles, i.e. the materials once activated can destroy the particles in which they are embedded leaving free the biological active principle.

The invention claimed is:

1. A ceramic colorant in the form of a suspension, the colorant comprising particles of colorant having nanometric dimensions, wherein the suspension contains a solvent selected from the group consisting of diethylene glycol, ethylene glycol, and polyethylene glycol, wherein the suspension includes an appropriate amount of water to facilitate hydrolysis, and wherein the particles of colorant are selected from the group consisting of:

$M^{II}M^{III}_2O_4$, where $M^{II}$ is selected from the group consisting of $Fe^{II}$, Zn, Co, Ni, and Mn, and $M^{III}$ is selected from the group consisting of $Fe^{III}$, Al, Cr, and Mn;

$CoAl_2O_4$;

$Ti(Sb,Cr)O_2$;

$(Zr,Pr)SiO_4$;

$(Zr,V)SiO_4$;

$(AlCr)_2O_3$;

$(Al,Cr)MO_3$, where M is selected from the group consisting of Y, Nd, Sm, Eu, Gd, Tb, Dy, Ho, Er, Tm, and Yb;

$Ti(Sb,Ni)O_2$;

$(ZrV)_2$;

$(Sn,V)O_2$;

$CaSn_{1-x}Cr_xSiO_5$, where x is between 0.01 and 0.1;

$Sn_{1-x}Cr_xO_{3-x/2}$, where x is between 0.01 and 0.1;

$Au^0$;

$Ag^0$; and $Cu^0$.

2. The ceramic colorant according to claim 1, in which the particles have diameters of between 5 nm and 600 nm.

* * * * *